Feb. 9, 1960　　　　　A. R. MORE　　　　　2,924,051
METHOD OF AND MEANS FOR PACKAGING ARTICLES
Filed April 22, 1957
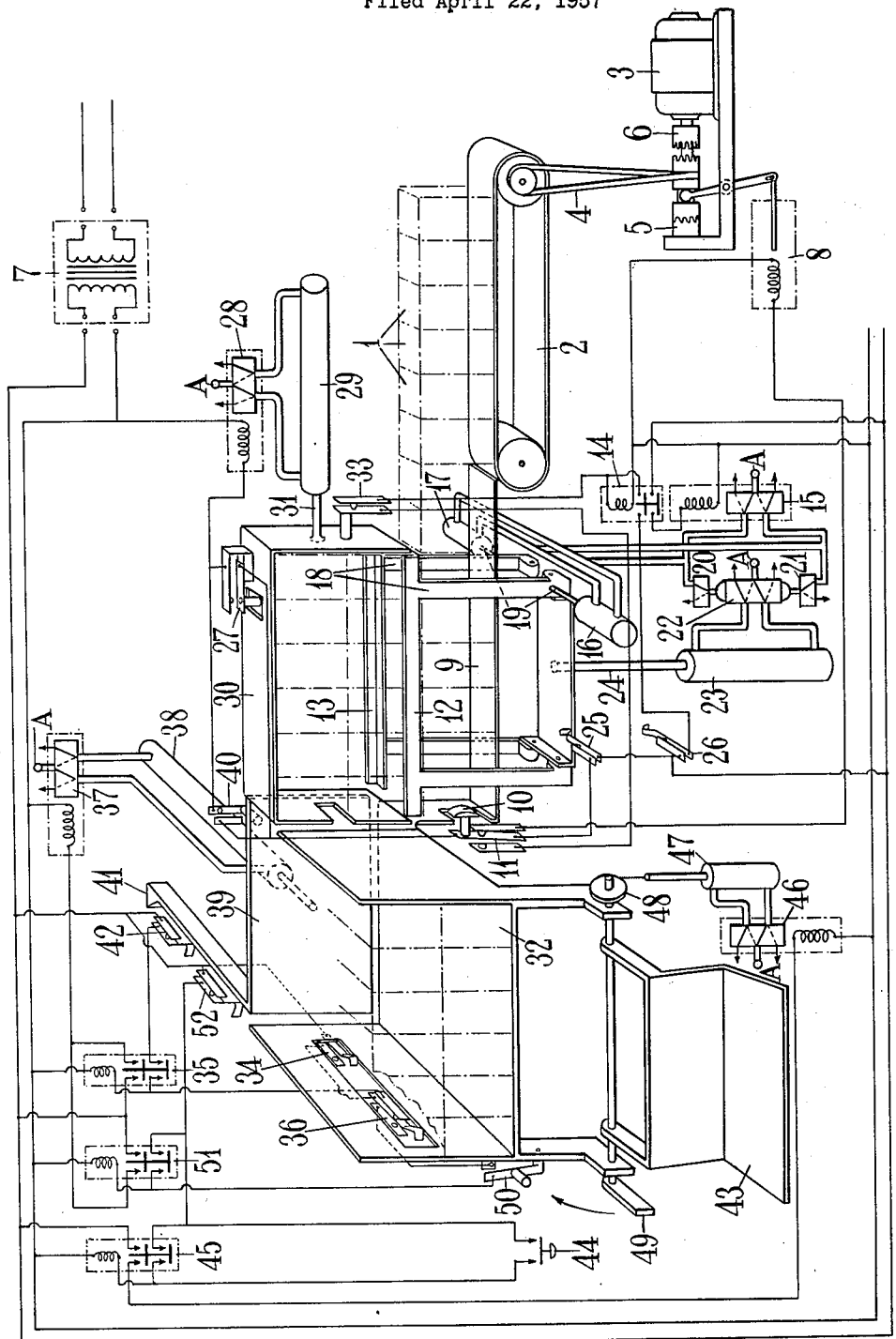
Inventor
A. R. More
By Glascock Downing Seebold
Attys.

2,924,051
METHOD OF AND MEANS FOR PACKAGING ARTICLES

Arthur Rowlatt More, Croydon, England, assignor to H. W. Wallace & Company Limited, Croydon, England Application April 22, 1957, Serial No. 654,097

Claims priority, application Great Britain April 24, 1956

20 Claims. (Cl. 53—26)

This invention relates to methods of and means for packaging articles.

The object of the present invention is to provide a machine for placing regular shaped articles such as packets into a carton, box or the like in their required rows and layers and for that purpose the invention consists in a method of filling cartons, boxes and the like with articles comprising assembling the articles in a horizontal line in contact with one another, moving the line longitudinally of itself until a first group of articles, having an overall dimension substantially equal to the one principal dimension of the open side of a carton, box or the like to be filled, coincides with a predetermined position and bringing the line to rest, moving said first group of articles together vertically by elevating means a predetermined distance greater than the vertical dimension of the articles holding said first group elevated by said elevating means while the second group is positioned under said first group, the second group and subsequent groups, if any, being, with repetition of the aforesaid movements moved into the position occupied by the previous group and in contact with the latter they move together, until the subsequent group moves into the position occupied by the previous group, and continues to be repeated until the overall dimension of the tiered-row measured vertically substantially equals the other principal dimension of the open side of the container, and moving said tiered row directly or indirectly, alone or with others into the container.

The invention further consists in a packaging machine for carrying out the method as set forth in the preceding paragraph comprising means for assembling the articles in a horizontal line in contact with one another, and for moving the line longitudinally of itself intermittently and in synchronism with the cycle of operation of the machine, and stopping said longitudinal movement so that a group of the articles comes to rest in a predetermined position, means for moving said group vertically, a restricted distance greater than the vertical dimension of the articles in the group, means to control the repetition of the aforementioned cycle of operations, until a predetermined number of tiers of said groups are accumulated in intimate contact vertically and in regular formation, and means for moving directly or indirectly said accumulated formation of articles bodily towards or into the open side of a carton, box or the like and if necessary repeating the whole operation automatically until the latter is filled.

The final step comprising moving the tiered groups bodily into the container may be effected as a continuation, in the same direction, as the previous transverse movement, may be effected as a movement at right angles both to the transverse direction and the said longitudinal direction and then in a transverse direction or wholly in a longitudinal direction.

In one form of embodiment of a machine packets of uniform size are formed into a single horizontal line or column, such as by, for example, a conveyor belt, and are fed into the machine intermittently by a feeder comprising two power driven belts which bear against opposite sides of the said column. From this column the machine accepts a group of packets of sufficient length to fill one dimension of the rectangular opening of a container, for example, a carton. Two elevating rails of the aforesaid length are situated parallel with and normally positioned just above the level of the top of the accepted group of packets. This level is the same as the lower internal face of the carton when positioned on the machine ready to receive its future contents, said carton being mounted in such a way that its opening is in a vertical plane and one side horizontal.

The two rails, both of which are of L section have each one arm of the L positioned upwards and the other inwards, the upwardly pointed arms of the L being separated by a distance equal to the width of the line or packets in the group situated beneath them. The horizontal arms are therefore over the top of the group of packets.

These rails are mounted upon a mechanism which causes them simultaneously each to perform a cycle of movements as follows, firstly to move away from one another so that their innermost edges are further apart than the width of the line of packets, secondly to move downwards so that their horizontal members are below the level of the line of packets, thirdly to move inwards so that their vertical members make contact with the sides of the group of packets and their horizontal members are beneath said packets and lastly to move upwards, thus elevating the group of packets.

It will be understood from the above that the underside of the elevated group of packets is in the same horizontal plane as the lowest internal horizontal surface of the container, and that, therefore, only horizontal movement or movements are necessary to move the group of packets into the container, and that the underside of the elevated group of packets is at a level which is slightly above the following packets and that, therefore, a further group of packets can be fed in beneath the elevated group of packets.

When a second group of packets is fed under the first group of packets and the supporting rails repeat their cycle of movements, the first group is deposited on the second group and both groups are elevated together, so forming a group of the original length but tiered two packets high.

Still further groups of packets can be fed into the machine and the cycle repeated until they are built or tiered to a sufficient height to occupy the vertical opening of the presented carton.

When this stage is reached the tiered group of packets is moved bodily along the length of and off the rails and onto a horizontal platform from which it is straightway transferred bodily at right angles towards the open mouth of the carton through a distance slightly exceeding the width of this tiered group.

In a similar manner, additional tiered groups of packets are added to this platform, each succeeding one moving the previous one or ones forward and towards the open mouth of the container. When a sufficient quantity of tiered groups have accumulated on the platform to fully occupy the depth of the container, the assembled packets are transferred, as one unit, into the open mouth of the container. The container can then be automatically lowered and at the same time be turned through 90° so that its open side faces upwards.

The accompanying drawing shows, by way of example only, one embodiment of the invention in which the packages 1 are fed into the machine as required by the endless belt conveyor 2 which is driven by the electric motor 3 by way of the belt 4. The drive from the motor is provided with a double dog-clutch which, in the position shown, brakes the endless belt by becoming engaged with the fixed clutch member 5, while in the opposite position becomes engaged with the continuously rotating clutch member 6, thus causing the conveyor to move. The packages are brought to the conveyor 2 by a further conveyor, not shown, and positioned longitudinally of the same, the action being that when the conveyor 2 is stationary packages accumulate thereon, and due to friction, act as a barrier and hold up the supply to the machine.

The machine is supplied with electric current either directly from the supply mains or by way of a step-down transformer 7, depending on the voltage required by the various electrical components chosen for the machine. The mechanical movements other than the feeding of the machine by the conveyor 2 are carried out by air pressure, and for this purpose the machine is provided either with an electric motor driven compressor feeding an accumulator having a pressure relief valve or means is provided by which compressed air may be taken from a main supply of compressed air whichever is the more convenient.

The machine as diagramatically shown is in the condition before the electric current is turned on, and is ready to receive the packages. If the machine is empty when the current is turned on, the solenoid 8 is energised and the movable clutch member is pushed over to engage with the clutch member 6, thus operating the conveyor 2. Packages are fed along the platform 9 until the first package engages the operating button 10 and the switch 11 thus breaking the circuit of the solenoid 8 and bringing the conveyor to a standstill.

The L-shaped supporting members 12 and 13 are arranged to make a cyclic movement outwardly, downwardly, inwardly and then upwardly such as to enter below the row of packages on the platform 9 and lift them by completing the cycle to the position shown in the drawing. This takes place immediately the switch 11 is operated by the front package. The closing of the contacts to the left of this switch energises the solenoid operated contactor 14 the bottom pair of contacts of which closes the circuit of the solenoid operated air valve 15. The upper contacts provide a second source of supply to the solenoid thereon by way of the switch 26.

The solenoid operated valve 15 provides paths as shown in the drawing for air under pressure supplied to the connection A from a common source of supply, when not energised, i.e. air is supplied to the outer ends of the operating cylinders 16 and 17 which forces the piston in each inwardly and holds the arms 18 of the support members 12 and 13 vertically by way of the rods 19. However, as soon as the valve 15 is operated the air is directed to the opposite ends of each of the cylinders 16 and 17 and the arms 18 are caused to lean outwardly upon their pivots and thus to separate the support members 12 and 13 a sufficient distance to clear the packages on the platform.

It will be seen that there are connections from the pipes supplying the cylinders 16 and 17 to the air pressure operated delay valves 20 and 21. When the solenoid operated valve 15 is not energised and the arms 17 are held vertical the pressure air also reaches the delay valve 20, which has previously assumed the position to allow air to pass to the air-operated valve 22 to place it in the condition as shown in the drawing in which air supplied to the connection A is directed to the lower end of the cylinder 23 thus urging the piston therein to hold the elevating mechanism at its upper limit of movement by means of the rod 24. When the solenoid operated valve 15 is energised, as previously described, air passes to the delay valve 21, which, after a short delay, allows the air to pass to the pressure operated valve 22, thereby changing it over to pass air from the connection A to the upper end of the cylinder 23 instead of to the lower end, by which action the piston is forced downwardly and the support members 12 and 13 are brought just below the level of the bottoms of the packages standing on the platform 9.

It will be observed that, not only in the case of the valves so far referred to, but also the other valves, provision is made for the air contained on one side of the piston or the valve member which they control, to pass out by way of said valves to atmosphere as indicated by arrows, when the piston or valve member moves. So far, in the cycle of operations of the machine, as soon as packages are fed thereto, the position has been reached in which the support members 12 and 13 have moved outwardly and downwardly, and in such movement downwardly the switch 25 has been released and thus opened thereby removing the first source of supply to keep the contactor 14 energised, and that in the lowered position the switch 26 is opened and the second source of supply energising the contactor 14 is removed and the contacts thereof become opened thereby removing the current from the solenoid operated valve 15 which immediately changes over to the position shown in the drawing, with the result that the air is passed to the outer ends of the pistons 16 and 17 which close in the support members 12 and 13 to engage under the packages on the platform, while, after a slight delay caused by the delay valve 21, air is passed to the lower end of the cylinder 23 and the support members are lifted to the position as shown in the drawing, thus completing one cycle of operation of the elevating mechanism.

The machine illustrated has facilities for stacking the groups of packages in a double tier and therefore in order to achieve this the elevating mechanism performs two cycles of operation as just described before the next cycle of operation of the machine as a whole is carried out. As soon as the first group of packages has been lifted to the position in which they rest on the support members elevated to the position as shown in the drawing, the switch 25 closes, and as the switch 11 is returned to the right, the circuit of the solenoid operated clutch mechanism is coupled and a further group of packages is fed into the machine and the cycle of operation of the elevating mechanism instituted again by the operation of the switch 11 by the first package as before.

When the support members 12 and 13 move sideways in commencing their cycle of operations the packets resting thereon are deposited upon the tops of the group resting on the platform, and consequently, when the support members move upwardly they lift the two tiered groups of packages together, the position of the switch 27 being such that its contacts are closed by the upper packets when they reach the top.

The closing of switch 27 completes the circuit of the solenoid operated valve 28 and in changing it over passes the air from the connection A with the source of supply to the right hand end of the cylinder 29, thus causing the piston therein to move to the left and push the inverted U-shaped box-like member 30 by means of the rod 31, sliding the double tiered group of packages with it on to the platform 32. Seeing that the supply of current for the valve 28 passes through the switch 25, the transverse movement to the left cannot take place when the elevating mechanism is in any other position than that in which the support members are for the elevated position. Also, seeing that the switch 33 opens as soon as the transverse movement commences, movement of the elevating mechanism is prevented until the transverse mechanism is returned to the position shown in the drawing.

At the completion of the transverse movement to the left the end package to the left contacts the switch 34 and closes the circuit of the solenoid operated contactor 35 by way of the switch 36. The upper pair of contacts of this contactor closes the circuit of the solenoid operated valve 37, while the bottom pair of contacts, also completes the contactor operating circuit by way of the switch 42.

As soon as the valve 37 is operated the air is passed to the further end of the cylinder 38 and the piston therein is moved causing the ejector plate 39 to move in the direction of the platform 32 by means of its rod. Immediately the plate 39 moves the switch 40, which is fastened to the frame of the machine, is closed, and being in parallel with the switch 27, maintains the current through the solenoid operated valve 28 when the packages are removed by plate 39 from the switch 27.

After the ejector plate has moved a distance a little greater than the thickness of the tiered group of packets the cam member 41 engages the switch 42 and opens the circuit to allow the contactor 35 to open, thus breaking the circuit through the solenoid operated valve 37, which then returns to the position shown in the drawing, with the result that the ejector plate 39 is returned to the position in the drawing, and in so doing, opens the switch 40, which in turn opens the circuit of the solenoid operated valve 28 which returns to its position in the drawing and the box-like structure 30 is drawn back, also into the position of the drawing.

The machine is now in a condition to execute another cycle of operations by which a second tiered group of packages arrives on the platform 32 and is ready to be moved by the ejector plate, but the distance travelled by this plate depends upon the number of tiered groups it is required to accumulate on this platform before, by means of an extra long stroke, an awaiting box is filled to capacity in one operation.

Before the above can take place a box must be in position to receive the goods.

An empty box is placed mouth upwards on the hinged platform 43 and the button switch 44 pressed with the finger. This closes the circuit of the solenoid operated contactor 45, the lower contacts of which are in parallel with the button switch 44 and which therefore hold the circuit closed when the button is released. The upper pair of contacts of this contactor close the circuit of the solenoid operated valve 46 changing the connection A from the source of pressure air over to the upper end of the cylinder 47, by which the piston therein is forced down and the wheel 48 rotated to lift the box supporting platform and position the mouth of the box ready to receive the packages. The arm 49 contacts the switch 50 and closes the circuit of the solenoid operated contractor 51 by way of the switch 36.

In the event that the box is placed in position by the above method before the full complement of packages is accumulated on the platform 32, the contactor 51 will not operate until sufficient tiered groups have accumulated as will contact the switch 36 thereby substituting the contactor 51. Therefore when the ejector mechanism operates it is not stopped after having moved only the thickness of a tiered group of packages by the switch 42, as it is now inoperative, and the cam 41 has to move the full distance to the switch 52 before breaking the circuit of the contactor 51. At the same time the circuit of contactor 45 is also broken with the result that the box is lowered from the platform 32 and the ejector plate returns to its position as shown in the drawing. By the above process the whole of the contents of the box are accumulated in their relative positions upon the platform 32 and then pushed as a whole into the box in one action to fill the box completely.

The number of tiered groups accumulated on the platform 32 before, by a final long stroke, they are placed in the box, depends on the distance between the switches 42 and 52 and 34 and 36 relative to the thickness of a tiered group of packages. It is a great advantage to accumulate the packages on the platform until the complete contents of a box are ready before ejection of the goods as a whole as thereby much time is saved, as by the alternative arrangement of ejecting the tiered groups one by one into the box would substantially interrupt the operation of the other parts of the machine. Furthermore, the box need not be in position the whole time and can be placed there even after the full load has accumulated.

The operations of the machine are fully interlocked, as hereinbefore described, and it is therefore impossible for one part to foul another or the box to be incompletely filled.

For the sake of clarity of the drawing, the pipes connecting the various valves together and to the source of pressure air have not been shown. This connection may be to a source external to the machine, or to a source contained upon the machine and driven by its own electric motor.

It is easily possible to modify the machine in such manner that the distances between the various parts and their controlling switches so that different sizes of boxes may be filled with different numbers of rows, tiers and so on, or the machine may be adapted to accommodate articles of different character, proportions, and dimensions.

It is to be understood that the description of the preferred embodiment of the machine is by way of example only and that details for carrying the invention into effect may be varied without departing from the scope of the invention claimed.

What is claimed is:

1. Method of filling cartons, boxes and the like with articles comprising assembling the articles in a horizontal line in contact with one another, moving the line longitudinally of itself until a first group of articles, having an overall dimension substantially equal to the one principal dimension of the open side of a carton, box or the like to be filled, coincides with a predetermined position and bringing the line to rest, moving said first group of articles vertically to a position above said predetermined position a predetermined distance greater than the vertical dimension of the articles, holding said first group of articles in said elevated position above said predetermined position by the means for elevating said group, moving a second group longitudinally along said line and under said first group, freeing said first group from said elevating means so that it takes its support upon said second group, the second group and subsequent groups, if any, being with repetition of the aforesaid movements moved into the position occupied by the previous group, and in contact with the latter, so that they move together until the subsequent group moves into the position occupied by the previous group, and the aforesaid movements continuing to be repeated until the overall dimension of the tiered row, measured vertically, substantially equals the other principal dimension of the open side of the container, and moving said elevated tiered row towards the container.

2. Apparatus for filling cartons, boxes and the like, with articles comprising assembling means for assembling the articles in a horizontal line in contact with one another and for moving the line longitudinally of itself intermittently and in synchronism with the cycle of the operation of the machine and stopping said longitudinal movement such that a group of the articles having an overall dimension substantially equal to one principal dimension of the open side of a container, box or the like to be filled, comes to rest in a predetermined position, elevating means for moving each and every said group vertically to a position vertically above said predetermined position a predetermined distance greater than the vertical dimension of the articles, said elevating means being adapted to hold a first group of articles in said elevated position above said predetermined position while a second group is moved by the assembling means along said line under said first group, the elevating means being adapted to be removed to free said first group to allow it to take its support upon said second group, control means controlling the repetition of the aforementioned cycle of operations until a predetermined number of tiers of groups have been elevated, and horizontal moving means for moving the elevated tiers of groups of articles towards the open side of a container and if necessary repeating the whole operation automatically until the latter is filled.

3. Apparatus as claimed in claim 2 in which the means for assembling the articles in a horizontal line and for moving the line longitudinally of itself intermittently and in synchronism with the cycle of operation of the machine is a belt conveyor driven intermittently by way of a clutch from a continuously rotating electric motor.

4. Apparatus as claimed in claim 3 in which the clutch is operated to disengage the motor by a solenoid connected in a circuit having a switch which is operated by the arrival of the articles in the said predetermined position.

5. Apparatus as claimed in claim 2 in which the means for elevating the group of articles is a pair of parallel horizontal support members which are arranged to make together a cyclic movement outwardly, downwardly, inwardly and upwardly to engage below the group of articles and raise them vertically said restricted distance.

6. Apparatus as claimed in claim 5 in which the elevating means is pneumatically operated, each support member by a cylinder for horizontal movement and together by a single cylinder for vertical movement.

7. Apparatus as claimed in claim 6 in which the horizontal movement of the support members is initiated instantly, directly or indirectly by a solenoid operated valve energised by a switch which is operated by the arrival of the articles at a predetermined position, while the vertical movement of the support members is initiated by the same valve but after a delay period.

8. Apparatus as claimed in claim 7 in which the delay period is provided by a pneumatically operated delay valve.

9. Apparatus as claimed in claim 6 in which the cyclical operation of the elevating means is interrupted by the operation of an electric switch above the latter by the arrival by the uppermost article at the most elevated position.

10. Apparatus as claimed in claim 9 in which the electric switch is situated in such a position as to be operated when more than one article in height is positioned on the elevating means and the latter is in its highest position.

11. Apparatus as claimed in claim 5 in which the articles when elevated enter a box-like structure adapted to engage the articles and two walls of which move them longitudinally of and from the support members.

12. Apparatus as claimed in claim 11 in which the box-like structure is moved by means of a pneumatically operated cylinder, the operation of which is initiated by a solenoid operated valve in circuit with which there is a switch operated by the arrival of the articles at their most elevated position.

13. Apparatus as claimed in claim 12 in which the operation of the elevating means is prevented except when the box-like structure is in the correct position to receive the articles, by the operation of a switch.

14. Apparatus as claimed in claim 11 in which the articles are moved from the support members on to a horizontal platform from which they are pushed into the container by means of a pneumatically operated ejector.

15. Apparatus as claimed in claim 14 in which the operation of the ejector is initiated by the closing of a switch by the arrival of the articles in their correct position upon the platform.

16. Apparatus as claimed in claim 15 in which the length of the stroke of the ejecor is controlled by electric switch means operated by articles accumulated upon the platform.

17. Apparatus as claimed in claim 2 in which the container is placed in position to receive the articles by pneumatically operated means and is provided with a switch operated by said means which prevents the ejection of the articles in the absence of a container.

18. Apparatus as claimed in claim 2 in which the solenoid operated valves controlling the pneumatic cylinders are controlled by solenoid operated contactors operated by switches interlocked to maintain correct sequence of operation of the parts of the machine and to prevent fouling of the parts.

19. Apparatus as claimed in claim 3, in which the elevating means operates a control switch which prevents the operation of the conveyor when the elevating means is in any other than its most elevated position.

20. Apparatus as claimed in claim 11, in which the return of the box-like structure to its article receiving position is prevented by the breaking of an electric circuit by the movement of the ejector.

References Cited in the file of this patent

UNITED STATES PATENTS

| | | |
|---|---|---|
| 2,376,176 | Neja | May 15, 1945 |
| 2,498,071 | Dalziel et al. | Feb. 21, 1950 |
| 2,648,181 | Dalton | Aug. 11, 1953 |
| 2,678,151 | Geisler | May 11, 1954 |
| 2,681,171 | Brown, et al. | June 15, 1954 |
| 2,732,984 | Dans | Jan. 31, 1956 |
| 2,738,116 | Barraclough | Mar. 13, 1956 |